July 28, 1970  R. A. MacARTHUR  3,522,067
METHOD FOR PREPARATION OF INSULATION PANELS
OF EXPANDED PERLITE PARTICLES
Filed June 12, 1967

INVENTOR
Roger A. MacArthur
by McDougall, Hersh, Scott
and Ladd  Atty's

United States Patent Office 3,522,067
Patented July 28, 1970

3,522,067
METHOD FOR PREPARATION OF INSULATION PANELS OF EXPANDED PERLITE PARTICLES
Roger A. MacArthur, Hinsdale, Ill., assignor to Central Manufacturing District, Chicago, Ill., a Massachusetts trust
Filed June 12, 1967, Ser. No. 645,292
Int. Cl. C04b 43/00
U.S. Cl. 106—84                                16 Claims

ABSTRACT OF THE DISCLOSURE

Light weight insulating structures of expanded perlite bonded with sodium silicate, with or without clay, in which the expanded perlite particles are treated with a polyvalent silicofluoride before combination with the sodium silicate and mixed to provide a protective coating on the expanded perlite particles and to agglomerate fines on the surfaces of the particles of expanded perlite to provide coarse particles with greater spacial separation therebetween and in which the silicofluoride operates to gel the binder before filling the coarse particles or removing the agglomerated fines.

---

Figure 1:
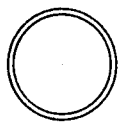

This invention relates to low cost, low density panels, tiles or shaped products of expanded perlite and to the method of manufacturing same. It relates more particularly to highly porous low density products and panels of expanded perlite bonded with an alkali metal silicate, such as sodium silicate, with or without clay.

Sodium silicate-clay bonded panels of expanded perlite have heretofore been produced but such panels have been characterized by lack of uniformity in density through the cross-section of the panel, segregation of fines, insufficient moisture resistance and relatively poor strength.

In the Campbell Pat. No. 2,481,390, description is made of a process for the production of a sodium silicate bonded vermiculite wherein an acidic substance, such as magnesium fluorosilicate, is employed to precipitate the sodium silicate binder before it penetrates to densify portions of the vermiculite or other fibrous filler used in the production of an insulating panel. In order to achieve sufficiently uniform distribution of the sodium silicate binder, Campbell found it necessary to peptize the sodium silicate, as by the formulation of the sodium silicate binder with substantial amounts of urea. Thus the binder is maintained in a fluid state for a length of time sufficient to effect uniform distribution with the vermiculite before setting to form the bonded product.

There are a number of deficiencies in the procedures heretofore employed. The peptizing agent, in the form of urea, reacts unfavorably on the stability of the insulating structure in that it materially decreases the moisture resistance of the silicate adhesive and the product that is formed thereof and it tends to produce undesirable discolorations into the product.

An important concept of this invention, which is confined to panels formed of expanded perlite, is the formation of the expanded perlite particles with small fines agglomerated onto the surfaces of the expanded perlite particles to give a vastly improved composite structure in which the agglomerate occupies a much higher apparent volume to increase the spatial distances between particles. At the same time the fines agglomerated onto the expanded perlite particles provide a coarse particle which operates to effect an improved bond between the particles with less adhesive thereby to produce a bonded structure of greater strength and toughness and in which the fines ordinarily present in the use of expanded perlite particles become taken up by the expanded perlite particles to provide for their uniform distribution. Thus segregation of the fines and densification in portions of the structure are completely avoided so that an acoustical product of maximum porosity, with uniformity in porosity throughout the cross-section of the bonded structure, can be achieved. When, as in the aforementioned Campbell patent, a peptized sodium silicate binder is employed, the binder component which remains liquefied for distribution is able to wash the agglomerated fines from the surfaces of the expanded perlite particles whereby the concepts described are incapable of being achieved.

It is an object of this invention to produce and to provide a method for producing an improved structure of bonded expanded perlite particles in which the bonded structure is characterized by uniformity in distribution of the particles in cross-section of the bonded structure; in which little, if any, moisture or binder penetrates into the expanded perlite particles thereby to maximize the porosity of the bonded structure without interfering with its strength; in which the segregation of fines is avoided, and in which a strong and dimensionally stable moisture resistant, expanded perlite panel or tile is produced in a simple and efficient manner from readily available and low cost materials, in which a panel of increased porosity and with uniformity of porosity on cross-section of the panel is produced.

These and other objects and advantages of this invention will hereinafter appear and for purposes of illustration, an embodiment of the invention is shown in the accompanying drawing, in which—

Figure 2:
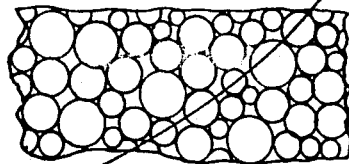

FIG. 1 is a sectional view of expanded perlite particles processed in accordance with the preferred practice of this invention; and FIG. 2 is a sectional view through a panel of expanded perlite particles prepared in accordance with the practice of this invention.

The invention will be described with reference to a typical example of the practice of the invention in the preparation of a low cost dimensionally stable tile of interbonded expanded particles of perlite and compositions for use in the preparation of same. It will be understood that changes may be made in the details of the formulation and materials without departing from the spirit of the invention.

EXAMPLE 1

In a first step, the expanded perlite particles are first coated by treatment with magnesium silicofluoride. The expanded perlite particles, marketed by Johns-Manville under the trade name "Seven Hills Ore No. P320," have a density of 5.8–6.2 pounds per cubic foot and a size distribution as follows:

| Percent by weight: | U.S. screen size |
|---|---|
| 8–12 | +16 |
| 15–22 | −16 to +20 |
| 35–45 | −20 to +30 |
| 29–37 | −30 to +50 |
| 2–5 | −50 to +100 |
| 2 max. | −100 |

For this purpose, 8 cubic feet of the expanded perlite particles are wet with one quart of an aqueous solution containing 6 ounces of magnesium silicofluoride per quart. Application to coat the expanded perlite particles is preferably made by spraying with fine sprays onto the expanded perlite particles as they are tumbled in a suitable mixer, such as a rotary paddle mixer or a ribbon blender. Application by spraying is extended over a period of about 60 seconds and mixing is continued only for a short period of time thereafter, such as for from 10 to 120 seconds, uniformly to distribute the treating composition without excessive breakdown of the perlite particles and for agglomeration of the perlite fines onto the treated surfaces of the expanded perlite particles. This operates to agglomerate the fines onto the surfaces of the expanded particles of perlite in a manner to increase the effective dimension of the coated perlite particles for maximum spacing in the bonded structure to be formed. Further, this operates to prevent segregation of the fines in a manner which would increase the density and non-uniformity of the molded product that is formed. The treated particles of expanded perlite remain free flowing and dry in appearance. The treated particles of expanded perlite can be dried, as by exposure to elevated temperature in an air drying furnace, or else used as an ingredient in the subsequent formulation of the bonded structure without previous drying.

In a separate container, 3 gallons (34.8 pounds) of sodium silicate (Philadelphia Quartz Company, adhesive grade 41° Baumé) is intimately mixed with 7 pounds of pre-screened ASP No. 170 clay and 42.6 ounces of water. Mixing is carried out in a double bladed agitator uniformly to disperse the clay with the aqueous sodium silicate solution and to keep the clay in a state of suspension. The resulting mixture will be calculated to have an approximate density of 12.6 pounds per gallon. An additional amount of 3 gallons of sodium silicate is added with mixing whereupon the system is ready for combination with the treated perlite particles.

The clay-sodium silicate water phase is added to the treated particles of expanded perlite by spraying onto the particles as they are being tumbled and cascaded in a rotary drum mixer (Munson) of 30 cubic foot capacity. Application by spraying is achieved in about 100 seconds after which mixing is continued for only another 30 to 120 seconds more uniformly to distribute the materials in completion of the batch in which the materials are present in the following amounts:

COMPOSITION OF THE BATCH MIXTURE PREPARED AS IN EXAMPLE 1

| Material | Solids by weight | Water by weight |
|---|---|---|
| 1. Expanded perlite | 50 lbs. | |
| 2. Magnesium silicofluoride solution | 6 oz. | 32 oz. |
| 3. Sodium silicate-clay-water suspension pre-mix: | | |
| (a) Sodium silicate | 13 lbs. 1 oz. | 21 lbs. 12 oz. |
| (b) Clay | 7 lbs. | |
| (c) Water | | 43 oz. |
| 4. Added sodium silicate | 13 lbs. 1 oz. | 21 lbs. 12 oz. |
| Totals | 83.5 lbs. | 48.2 lbs. |

The prepared batch of Example 1 can be molded to form 60 acoustical tiles of 12" x 12" x ⅞", weighing approximately 1.39 pounds per tile when dried and set.

In the practice of the present invention it is believed that a chemical reaction takes place between the magnesium silicofluoride and the sodium silicate binder resulting in the formation of a protective gel on the surface of each of the expanded perlite particles. The protective gel operates to isolate the sodium silicate to prevent it from entering the expanded perlite particles thereby to preserve their granular structure in the resulting acoustical tile. More importantly, the magnesium silicofluoride serves to set the sodium silicate binder substantially immediately upon contact. In the absence of the magnesium silicofluoride, the sodium silicate could penetrate the expanded particles or perlite with the result that the acoustical tile would be characterized by a greater density with correspondingly less acoustical properties. In the absence of the magnesium silicofluoride immediately to set the sodium silicate upon contact, the sodium silicate would be able to wash the fines from the surfaces of the expanded perlite particles and thereby reduce the agglomerate and the distinctive advantages achieved by the coarse perlite particles having increased volume for spatial separation.

In addition to its function, described above, the magnesium silicofluoride serves to agglomerate the fine particles of expanded perlite or fines whereby they become tied onto the surface of the expanded perlite particles for uniform distribution throughout the perlite mass as distinguished from the segregation of the fines which might otherwise occur. This relationship has been found unexpectedly to increase the strength of the final product. This increase in strength resulting from the agglomerated fines on the surfaces of the treated perlite particles is difficult to explain but it appears that they form bridges across the relatively coarser particles of expanded perlite to provide nuclei to which the fluid binder can flow for concentration of the binder at the point of contact by the particles thereby to maximize the utilization of the binder as an interbonding agent for the perlite particles. Such agglomeration onto the treated particles of expanded perlite operates also to minimize the fines which would operate otherwise to densify the product. In any event, the fines agglomerated onto the surfaces of the expanded perlite particles operate to increase the apparent dimension of the expanded particles whereby a lesser number of particles are required to occupy a given volume thereby to enhance the porosity and correspondingly reduce the density of the final product without corresponding decrease in strength.

Another unique result from the combination described resides in the ability of the magnesium silicofluoride to function on the surfaces of the expanded perlite particles as a chemical catalyst to effect gelation of the sodium silicate upon contact. This has the beneficial effect of preventing flow of the sodium silicate into the expanded particles of perlite and to inactivate the sodium silicate in a manner to minimize the attack on the treated particles of expanded perlite. Gelation of the sodium silicate almost immediately upon contact with the treated surfaces of the expanded perlite particles operates rigidly to set the silicate and the composite mixture to form a dimensionally stable product.

The amount of magnesium silicofluoride can be varied over a fairly wide range. Beneficial results are secured when the magnesium silicofluoride is employed in an amount as little as 2 ounces per 8 cubic feet of perlite and the amount of improvement secured is insufficient to justify the use of additional amounts of magnesium silicofluoride in excess of 6 ounces per 8 cubic feet of perlite. For addition, it is desirable to formulate the magnesium silicofluoride in aqueous solution. The addition of water is desirable to improve the distribution of the silicofluoride binder during application so that a long mixing time or vigorous mixing is not essential to achieve good distribution with the expanded perlite particles. However, it is desirable to avoid the use of excess water, otherwise the mixture will not be free flowing and additional investment will have to be made where the treated particles are to be dried. For best practice, application of the desired amount of magnesium silicofluoride can be made when applied from ½ to 2 quarts of aqueous solution per 8 cubic feet of expanded perlite.

Treatment uniformly to distribute the binder and to coat the expanded perlite particles can best be made by spray application although the treating composition can be poured in fine streams onto the perlite particles as they are being tumbled. Mixture should be carried out in a gentle manner to avoid excessive breakdown of the expanded perlite particles to provide for initial distribution of the binder uniformly throughout the particles. For this purpose, it is desirable to make use of a rotating drum mixer with flights that lift the material to let it fall through the sprays of liquid in the form of the treating material and/or the sodium silicate binder. Instead, use can be made of a ribbon blender or a rotary blender of the paddle type. The magnesium silicofluoride and the sodium silicate binder composition can be applied in the same way into the same mixer or in different mixers.

For best distribution, it is desirable to introduce the treating composition slowly over a period of time ranging from ½ to 5 minutes. Additional mixing after addition of the treating composition is desirable uniformly to distribute the treating composition throughout the mass of expanded perlite particles as well as to enhance the agglomeration of fines onto the treated surfaces, as previously described.

Instead of magnesium silicofluoride, use can be made of ammonium or soluble polyvalent metal silicofluorides which are acid in character and which form water insoluble silicates, such as zinc silicofluoride.

The sodium silicate binder is preferably employed in an amount within the range of 4.5 to 7 gallons per 8 cubic feet of expanded perlite particles. As little as 3 gallons can be employed and it is undesirable, because of the increasing density, to make use of more than 8 to 9 gallons of sodium silicate per 8 cubic feet of expanded perlite.

As used herein, the term "clay" is meant to include the common clays, such as kaolin clay, ball clay, fire clay and the like, as represented by Grade UC55 clay of United Clay Mines or ASP-170 clay. The amount of clay can be varied but it is desirable to make use of at least 3 pounds of clay per 8 cubic feet of perlite to a maximum of about 25 pounds of clay per 8 cubic feet of perlite. The clay can be added in admixture with the sodium silicate, as in Example 1, or it can be added separate and apart therefrom but in advance thereof for admixture with the expanded perlite particles, before or after treatment with the magnesium silicofluoride.

The sodium silicate and clay, when applied as a wet admixture, is preferably mixed with the treated particles of expanded perlite by spraying onto the treated particles during mixing, as previously described. Mixing is continued for a short period of time of from ½ to 3 minutes after all of the sodium silicate-clay has been added more uniformly to distribute the materials.

When, as described, the dry clay is admixed with the expanded perlite particles prior to treatment of the particles with the magnesium silicofluoride, mixing is achieved in the usual manner in a dry blender or rotary paddle mixer and the solution of magnesium silicofluoride is added to the mixture to coat the particles of clay as well as the expanded perlite particles whereby the clay will cling to the surfaces of the perlite particles along with the fines to build up the particles and uniformly to distribute the clay with the perlite. The sodium silicate is then added as a separate component to the treated mixture of clay and perlite. If the clay and sodium silicate are added separately to the treated particles of expanded perlite, it is desirable to admix the clay before the addition of the sodium silicate.

The following are given by way of further examples of the practice of this invention:

EXAMPLE 2

8 cubic feet of expanded perlite are admixed with 6 pounds of clay in a dry blender uniformly to distribute the clay and perlite particles. 6 ounces of magnesium silicofluoride in 2 quarts of water is sprayed over a period of about 1 to 2 minutes onto the mixture of clay and expanded perlite with mixing continuing after the addition for about 1 to 2 minutes to distribute the treating composition.

Thereafter, 6 gallons of sodium silicate with 2 quarts of water added is sprayed into the treated mixture of clay and perlite with continued mixing for a period of about 2 minutes after the addition of sodium silicate to distribute the binder.

A batch suitable for molding into panels or tiles, as described in Example 1, is produced.

EXAMPLE 3

The expanded perlite is treated as in Example 1 except that ammonium silicofluoride is substituted in equal amounts for the magnesium silicofluoride. The dry clay is admixed with the treated particles of expanded perlite with continued mixing before the sodium silicate is added with the clay and sodium silicate being introduced in the amounts described in Example 1. When the sodium silicate is added as a separate component to the treated perlite and clay, it is desirable to effect still further dilution of the sodium silicate as by the addition of 2 to 6 quarts of water per 6 gallons of sodium silicate.

EXAMPLE 4

This example follows the procedure of Example 1 except that the expanded particles of perlite treated with magnesium silicofluoride are subjected to a drying step in an air drying oven at a temperature of 150–400° F. or by a direct flame drier before addition of the mixture of clay and sodium silicate.

EXAMPLE 5

The procedure of Example 1 is followed except for the substitution of aluminum monophosphate or dibasic aluminium phosphate for the magnesium silicofluoride.

A further concept of this invention resides in the combination which makes use of the magnesium silicofluoride in the treatment of expanded perlite particles with sodium silicate binder but without clay whereby the beneficial results of the treating material on the surfaces of the expanded perlite particles operate to agglomerate the fines on the surfaces of the expanded perlite particles to clock penetration of the sodium silicate into the expanded perlite particles and to effect substantially immediate gelation of the sodium silicate upon contact to set the binder without washing off the fines. This latter concept is illustrated by the following example:

EXAMPLE 6

6 cubic feet of expanded perlite are treated with 3 ounces of magnesium silicofluoride dissolved in 1 quart of water, as in Example 1. To the treated particles of expanded perlite, 5 gallons of sodium silicate is added with dilution with about 1 quart of water and the materials are mixed in a ribbon blender until uniform distribution is achieved.

Inclusion of fibrous materials as an additional component has been found to add toughness to the product molded of the aggregate. For this purpose, it is desirable to make use of inorganic fibers such as asbestos fibers or glass fibers in which the fibrous component is added preferably by admixture with the expanded particles of perlite before treatment with the magnesium silicofluoride so that the asbestos fibers will also become sealed to prevent absorption of excess amounts of sodium silicate. The fibrous component should not be employed in an amount greater than 10% by weight of the perlite with the preferred amounts falling within the range of 1–5% by weight of the perlite. In the modification of Examples 1–5, 3–4% by weight of asbestos is added to the perlite.

The batches prepared in accordance with the foregoing examples may be molded into individual acoustical tiles or to other shaped products in conventional molding apparatus and thereafter dried in a drying oven. It has been found that the molded forms should preferably be dried gradually in a drying oven with gradually increasing temperatures starting with about 70° F. and heating at a maximum temperature of about 470° F. at the outlet end of the drying oven. Such temperature assures that the tile is completely dried and cured such that an acoustical tile is produced which is dimensionally stable and will not expand, contract or warp in use beyond small or close limits of tolerance.

When, as in the preferred practice of this invention, clay is employed as a component of the binder system, it functions to enhance the fire-resistance characteristics of the molded product, it contributes to the structural and tensile strength of the product and it adds to the color of the product. In the use of clay it is important that the clay be thoroughly broken up in the sodium silicate-clay-water suspension so that lumps will be eliminated since, in the subsequent drying and curing of the product molded of the batch, it is essential that the clay particles be uniformly dispersed throughout the resulting product and in intimate contact with the silicate binder so that the silicate might react chemically with the clay during the drying and curing operation to inert the clay. These results are accomplished by the intimate premixing of the sodium silicate and clay, as in Example 1.

A dimensionally stable, acoustical tile produced in accordance with the batches of the present invention will be found to have the following characteristics:

A dimensionally stable, acoustical tile produced in accordance with the batches of the present invention will be found to have the following characteristics:

(1) It will contain less than 5 grams of water in an acoustical tile having the dimensions of 12" x 12" x ⅞" and it will weigh 640–660 grams;

(2) It will have a permanent clear bell-like ring;

(3) While it will gain or lose some weight in proportion to the humidity conditions existing, such weight changes will be relatively small and less than 8 grams per tile;

(4) Warpage of the tile in use will be less than ±0.03 measured from the maximum point of warpage.

The magnesium silicofluoride with which the expanded particles of perlite are treated operates, in accordance with the practice of this invention, as a barrier on the surfaces of the expanded perlite particles to seal the perlite and block the penetration of water or binder during manufacture of the composite product thereby to prevent absorption of liquids into the expanded particles; it operates to hold the sodium silicate binder for fuller utilization of the binder component whereby less of the binder is required without sacrifice in strength. The ability of the magnesium silicofluoride to gel sodium silicate is unique in that the sodium silicate is held out of the expanded perlite particles while immobilizing the sodium silicate so that it will not be able to break down the formed agglomerates with fines attached or otherwise attack the perlite.

The invention is addressed to the combination which makes use of expanded perlite particles as distinguished from vermiculite, bloated clays and the like. By itself, expanded perlite is not considered an excellent acoustical absorbent. Its ability to function as an absorbent in the structure of this invention depends greatly upon the increased spacial separation that is achieved by the agglomeration of fines on the surfaces of the expanded perlite particles and by achieving an immediate set of the sodium silicate binder thereby to avoid having the binder filling in the coarse particles or depreciating the spacial separation.

With the coarse particles that are formed by the agglomeration of fines onto the surfaces of expanded perlite particles, good insulating acoustical characteristics are achieved. Corresponding improvements would not result from an equivalent amount of fines otherwise incorporated, as by suspension to form a part of the binder component. Further, the expanded perlite particles are peculiar to the invention in that they are readily able to form their own fines in preparation so that the desired combination can be achieved.

While not equivalent to magnesium silicofluoride, as the material for pretreatment of the expanded perlite particles, use can be made of compounds formed of polyvalent metal salts which form acidic water solutions or in which the corresponding silicates are insoluble. Representative are the sulphates and the sulphuric acid salts of aluminum, magnesium and other bivalent or polyvalent metals.

It will be seen from the foregoing that this invention provides a new and improved acoustical tile or other product molded of expanded perlite and compositions and methods for the preparation of same.

It will be understood that changes may be made in the details of formulation and operation without departing from the spirit of the invention, especially as defined in the following claims.

I claim:

1. The method for preparation of a bonded insulated structure of expanded perlite particles, the steps of pretreating the expanded perlite particles with a solution of a silico-fluoride to coat the perlite particles, mixing the expanded perlite particles during and after treatment to agglomerate perlite fines on the surfaces of the expanded perlite particles to form coarse particles having greater spacial separation between particles, uniformly distributing sodium silicate binder solution free of a peptizing agent with the expanded perlite particles having the fines agglomerated on the surfaces thereof whereby the binder gels substantially upon contact with the coarse particles of perlite before filling the coarse particles and before removing fines agglomerated on the surfaces thereof, and molding the mixture to the shape of the product desired for cure into a bonded insulating structure.

2. The method as claimed in claim 1 in which the silicofluoride is magnesium silicofluoride.

3. The method as claimed in claim 1 in which the silicofluoride is ammonium silicofluoride.

4. The method as claimed in claim 1 in which the silicofluoride is introduced in an amount within the range of 2 to 6 ounces of silicofluoride per 8 cubic feet of expanded perlite particles.

5. The method as claimed in claim 4 in which the silicofluoride is diluted with water to a volume of ½ to 2 quarts for addition by spraying onto the expanded perlite particles.

6. The method as claimed in claim 1 in which the sodium silicate is introduced in an amount within the range of 3 to 9 gallons per 8 cubic feet of expanded perlite particles.

7. The method as claimed in claim 1 in which the sodium silicate is introduced in an amount within the range of 4.5 to 7 gallons per 8 cubic feet of expanded perlite particles.

8. The method as claimed in claim 1 in which the silicofluoride is uniformly distributed onto the surfaces of the expanded perlite particles by spraying into the stream of expanded perlite particles as they are cascaded during mixing.

9. The method as claimed in claim 8 in which the silicofluoride is introduced slowly over a period of time and then mixing is continued for a period of up to 3 minutes after addition.

10. The method as claimed in claim 1 in which the sodium silicate binder is uniformly distributed with the treated particles of expanded perlite by slowly spraying into streams of expanded perlite particles as they are cascaded during mixing.

11. The method as claimed in claim 10 in which mixing is continued for a period of up to 3 minutes after addition of the sodium silicate binder.

12. The method as claimed in claim 1 which includes finely divided clay as a component of the bonded structure in an amount within the range of 3–25 pounds of clay per 8 cubic feet of expanded perlite particles.

13. The method as claimed in claim 12 which includes the step of adding the clay to the expanded perlite particles before treatment with the silicofluoride.

14. The method as claimed in claim 12 which includes the step of mixing the clay with the sodium silicate binder before addition to the treated particles of expanded perlite.

15. The method as claimed in claim 12 which includes the step of introducing the clay by mixture with the treated perlite particles after treatment with the silicofluoride and mixing to agglomerate the fines but before addition of the sodium silicate binder.

16. The method of preparing a bonded insulating structure of expanded perlite particles, the steps of pretreating expanded perlite particles with a solution of a polyvalent metal salt that forms acidic water solutions or is insoluble as the corresponding silicate, mixing the expanded perlite particles during and after treatment with the polyvalent metal salt to agglomerate perlite fines on the surfaces of the particles to form coarse particles having greater spacial separation between particles, uniformly distributing sodium silicate binder free of a peptizing agent onto the surfaces of the treated particles of expanded perlite whereby the binder gels substantially upon contact with the treated perlite particles to prevent filling the coarse particles and removal of fines from the surfaces thereof, and molding the mixture to the shape of the product desired for cure into a bonded insulating structure.

References Cited

UNITED STATES PATENTS 2,481,390　9/1949　Campbell _____ 106—84

JAMES E. POER, Primary Examiner

U.S. Cl. X.R.

252—12